July 8, 1969 F. A. WILHELM, JR 3,454,310

BOOLIAN CONNECTIVE SYSTEM

Filed May 23, 1966 Sheet 1 of 4

INVENTOR.
FREDERICK A. WILHELM JR.

BY Allan Ratner

ATTORNEY

INVENTOR.
FREDERICK A. WILHELM JR
BY Allan Ratner
ATTORNEY

OPERATION CODE

| I(1) | I(2) | I(3) | I(4) | COMMON NAME | ALGEBRAIC FUNCTION | | ENABLED GATES |
|---|---|---|---|---|---|---|---|
| 0 | 0 | 0 | 0 | RESET | ZEROS → A | RESET → A | 26,27 |
| 0 | 0 | 0 | 1 | NOR | A NOR B → A | $\bar{A}\,\bar{B}$ → A | 26,33 |
| 0 | 0 | 1 | 0 | | A AND B → A | $\bar{A}B$ → A | 27,31 |
| 0 | 0 | 1 | 1 | COMPLEMENT | $\bar{A}$ → A | $\bar{A}$ → A | 31,33 |
| 0 | 1 | 0 | 0 | | $\bar{A}$ NOR B → A | $A\bar{B}$ → A | 26 |
| 0 | 1 | 0 | 1 | | $\bar{B}$ → A | $\bar{B}$ → A | 21,26 |
| 0 | 1 | 1 | 0 | EXCLUSIVE-OR | $A \oplus B$ → A | $A\bar{B}+\bar{A}B$ → A | 31 |
| 0 | 1 | 1 | 1 | NAND | A NAND B → A | $\bar{A}+\bar{B}$ → A | 21,31 |
| 1 | 0 | 0 | 0 | AND | A AND B → A | AB → A | 27 |
| 1 | 0 | 0 | 1 | COMPARE | $A \odot B$ → A | $AB+\bar{A}\bar{B}$ → A | 33 |
| 1 | 0 | 1 | 0 | | B → A | B → A | 20,27 |
| 1 | 0 | 1 | 1 | | $\bar{A}$ + B → A | $\bar{A}$ + B → A | 20,33 |
| | | | | | A → A | A → A | NONE |
| 1 | 1 | 0 | 1 | | $\bar{A}$ NAND B → A | $A+\bar{B}$ → A | 21 |
| 1 | 1 | 1 | 0 | OR | A + B → A | A + B → A | 20 |
| 1 | 1 | 1 | 1 | SET | ONES → A | SET A | 20,21 |
| | | | | | | | |

FIG. 3.

INVENTOR.
FREDERICK A. WILHELM JR.
BY Allan Ratner
ATTORNEY

INVENTOR.
FREDERICK A. WILHELM JR.
BY
Allan Ratner
ATTORNEY

United States Patent Office 3,454,310

Patented July 8, 1969

3,454,310

BOOLIAN CONNECTIVE SYSTEM

Frederick A. Wilhelm, Jr., Eatontown, N.J., assignor to Electronic Associates Inc., Long Branch, N.J., a corporation of New Jersey Filed May 23, 1966, Ser. No. 552,034

Int. Cl. H03k *19/06, 19/12, 19/20*

U.S. Cl. 328—92 10 Claims

Figure 1:
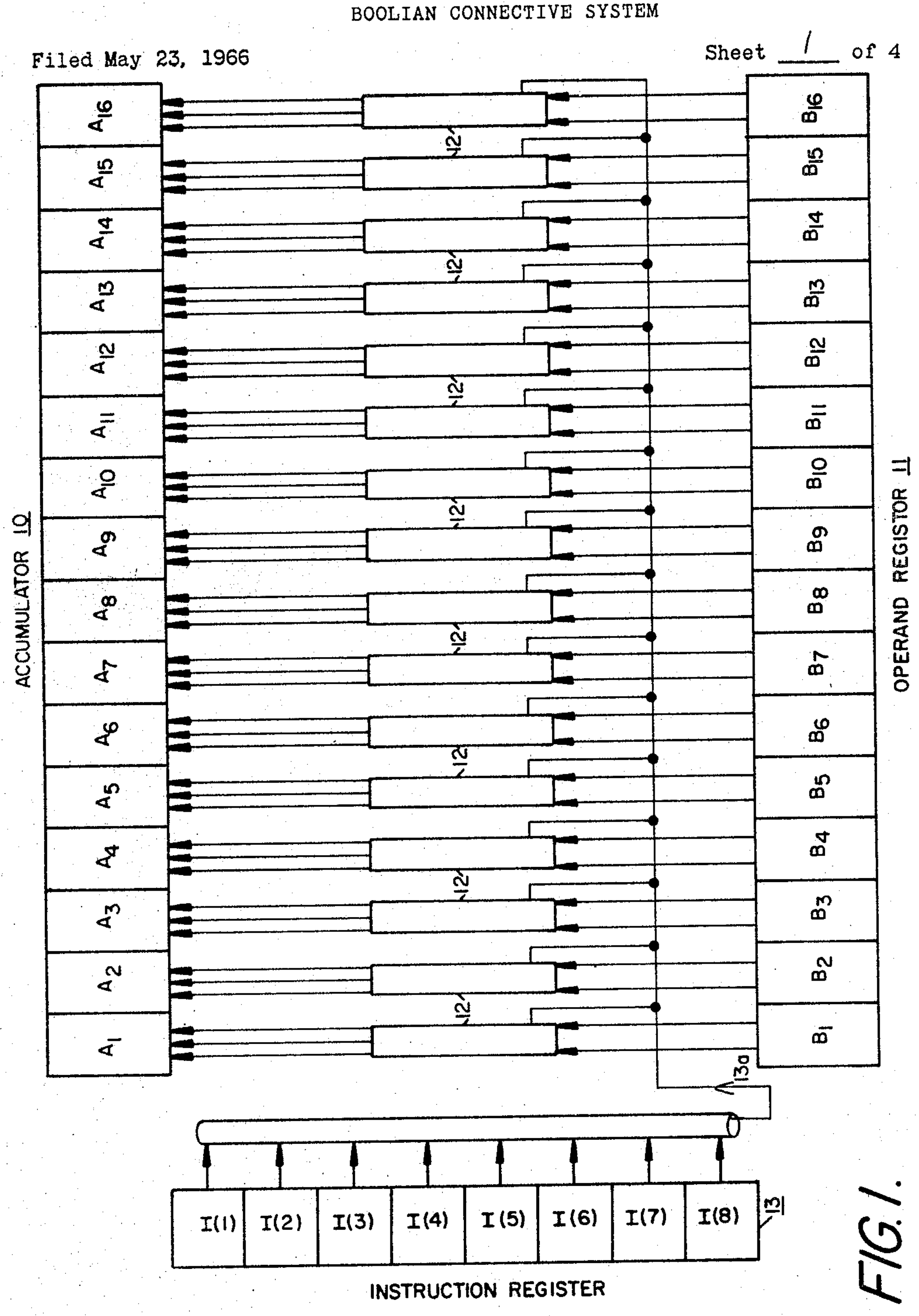

This invention relates to a logic system and more particularly to providing a desired one of a plurality of Boolian connectives upon application of a control signal.

In many digital computers an accumulator is utilized to store a binary word with another binary word stored in an operand register. The two words may be added together or may be operated on by other logic elements with the resultant of the two words being stored back in the accumulator. There are sixteen Boolian connectives or logical functions that may be performed between the binary word in the accumulator and the binary word in the operand register. These logical operations or functions are commonly performed by specific gates such as OR gates, AND gates, inverters, etc. In order to provide for all sixteen possible logical operations, it has heretofore been necessary to provide sixteen different gates, each performing its individual logical operation or function. As a result of this substantially large amount of hardware, many prior digital computers have required that the logical operations between the word in the accumulator and the word in the register be performed serially, bit by bit. This serial logical operation is very time-consuming. In order to substantially decrease the time of the logical operations, parallel techniques may be utilized. However, the hardware requirements become excessive for a practical digital computer.

Accordingly, an object of the present invention is a Boolian connective system for an accumulator and an operand register which may be switched to provide a selected one of a plurality of logical operations.

Another object of the invention is a system for providing logical operations in parallel between the accumulator and the operand register with an amount of hardware substantially less than in prior parallel systems.

In accordance with one form of the present invention, there is provided a plurality of logical networks for providing logical operations in parallel between binary cells of the accumulator (A) and corresponding binary cells of the operand register (B) and for storing the result back in the accumulator. Each of the logical networks including set, reset, and trigger gates means connected to a set, reset and trigger input respectively of a corresponding accumulator binary circuit. Each of the set, reset and trigger gate means includes a first and a second AND gate. Each operand register binary cell has its 1-side output connected to an input of each corresponding first AND gate and its 0-side output connected to an input of each corresponding second AND gate.

An instruction register is provided connected to each first and second AND gate of each logic network to provide instruction enabling signals to select a desired logical function to be performed simultaneously by the networks. If it is desired to select a logical function which is a true "anding" of the four possible combinations of the A and B literals, e.g., $\bar{A}\,B$, $A\,\bar{B}$, $\bar{A}\,\bar{B}$, AB, without using A physically, the following is produced: (a) when the B term of the function is true, an instruction enabling signal is applied to the second reset AND gate, (b) when the B term of the function is complementary an instruction enabling signal is applied to said first reset AND gate, and (c) when the A term of the function is complementary an instruction enabling signal is applied to (i) said first trigger AND gate when the B term is true and (ii) said second trigger AND gate when the B term is complementary.

Further, if it is desired to select a logical function which is a complementary "anding" of the four possible combinations of the A and B literals, e.g., $\bar{A}\,B$, $\overline{\bar{A}\,B}$, $\overline{A\,\bar{B}}$, $\overline{\bar{A}\,\bar{B}}$, without using A physically, the following is produced: (a) when the B term of the function is true an instruction enabling signal is applied to said second set AND gate, (b) when the B term of the function is complementary an instruction enabling signal is applied to said first set AND gate, and (c) when the A term of the function is true, an instruction enabling signal is applied to (i) said first trigger AND gate when the B term is true and (ii) said second trigger AND gate when the term is complementary.

In this manner, a selected one of a plurality of logical operations may be performed in parallel between the accumulator and the operand register with a minimum amount of hardware.

Figure 2:
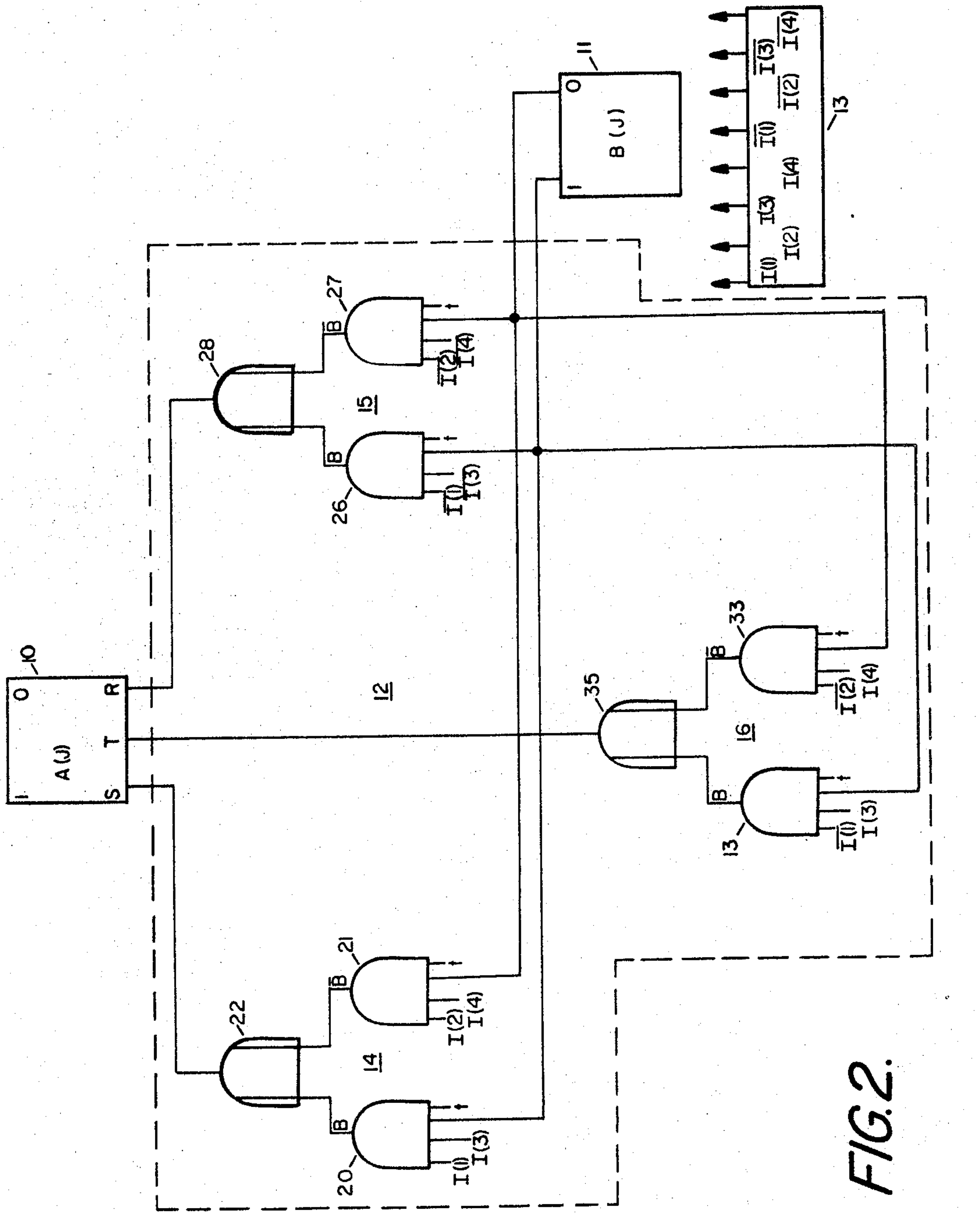
Figure 4:
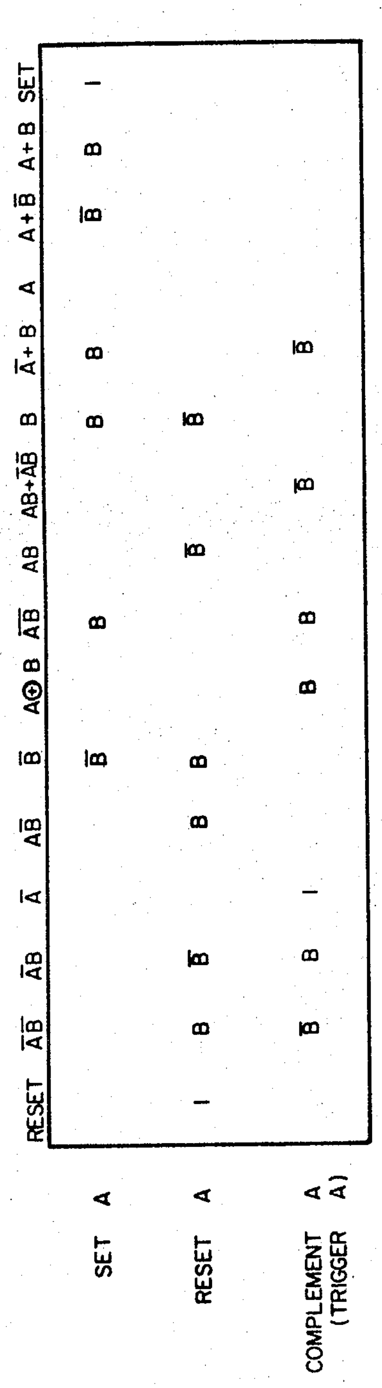

For further objects and advantages of the invention and for a discussion of a typical embodiment reference is made to the following description taken in conjunction with the accompanying drawings in which:

FIG. 1 illustrates in block diagram form an embodiment of the invention utilized with a sixteen bit accumulator and operand register;

FIG. 2 schematically illustrates a logic network shown in block diagram form in FIG. 1;

FIG. 3 is a table of the logical operations that may be produced by the logic network of FIG. 2; and FIG. 4 is a table useful in explaining the invention.

For the purpose of describing the invention and in accordance with logic terminology: a 1-state will be considered a high; a 0-state will be considered a low; a complementary function will be designated by a bar (—) or a prime ('); and a "lateral" may be defined as the true or the complementary state of a variable.

Referring now to FIG. 1 there is shown an accumulator 10 and an operand register 11 for a parallel digital computer which uses a sixteen bit word. Specifically, accumulator 10 has provision for sixteen bits, $A_1$ to $A_{16}$ and the operand register 11 has provision for sixteen bits $B_1$ to $B_{16}$.

In accordance with the invention, there are provided logic networks 12 corresponding in number with the number of bits in a word and respectively representative of said bits. Specifically, there are provided sixteen logic networks 12 with a first of the logic networks being connected with inputs from the least significant bits or cells of $B_1$ and with outputs to the least significant bits or cells of A. In the same manner, the second of the logic networks 12 is connected between bits or cells $A_2$ and $B_2$ of the accumulator and operand register respectively, etc.

All of the logic networks 12 are connected by way of a cable 13*a* to an instruction register 13 which is effective to simultaneously switch all of the logic networks 12 so that they all produce the same Boolian connective or logical operation at the same time. With all of the logic networks 12 providing the same logical operation, it is to be understood that the binary word in the operand register 11 is gated by a desired logical function into the logic network, and the resultant function stored in the accumulator.

In order to understand the operation of each of the logic networks 12 under the control of the instruction register 13, one of the networks, is a generalized case, is shown in detail in FIG. 2. In this generalized case, an accumulator cell or binary circuit is indicated as A(J) and an operand register cell is indicated as B(J). The B(J) cell comprises a single flip-flop 11 having a 1-side and a 0-side. When the 1-side of flip-flop 11 is high and the 0-side of flip-flop 11 is low, then that flip-flop is in a 1-state. On the other hand, when the 0-side is high and 1-side is low, then flip-flop 11 is in the 0-state. Two conductors are connected from flip-flop 11 to the logic network 12.

The accumulator cell A(J) comprises an A.C. coupled flip-flop 10 of the R.S.T. type as described, for example, at page 17–08 of Handbook of Automation, Computation and Control, edited by Grabbe, Ramo and Wooldridge, John Wiley & Sons, Inc., 1959. Accordingly, flip-flop 10 has three inputs, R, S, and T, which operate to reset, set or trigger flip-flop 10. These three inputs are connected by way of three conductors to the logic network 12.

Logic network 12 basically comprises three gorups of gates 14, 15 and 16. Gate group 14 corresponds to the set group, gate group 15 corresponds to the reset group and gate group 16 corresponds to the trigger or complement group. Each of the gate groups 14–16 comprises a pair of AND gates and a single OR gate having its inputs connected to the corresponding AND gates. One input of each of the AND gates is connected to the source of clock pulses represented by character "*t*." The gates and flip-flop 10 are adapted so that the flip-flop is switched at a "falling" edge of the clock pulse. The 1-side output of flip-flop 11 is connected to one of the two AND gates of each group 14–16 and the 0-side of flip-flop 11 is connected to the other of the two AND gates of each of the group. The remaining inputs of AND gates of groups 14–16 are connected to predetermined ones of the output of instruction register 13.

More particularly, set gate group 14 comprises AND gates 20 and 21 having their outputs connected to OR gates 22, the output of which is connected to the set input of flip-flop 10. One input of gate 20 and of gate 21 respectively connected to the 1-side and the 0-side of flip-flop 11. The remaining two inputs of set AND gate 20 (B) are connected to outputs I(1) and I(3) of instruction register 13. The remaining two inputs of set AND gate 21 (B′) are connected to I(2) and I(4) of instruction register 13. The reset gate group 15 comprises two AND gates 26 and 27 having their outputs connected to an OR gate 28, the output of which is connected to the reset terminal of flip-flop 10. One input of each of AND gates 26 and 27 is respectively connected to the 1-side and the 0-side of flip-flop 11. The remaining inputs of reset AND gate 26 (B) are connected to outputs I(1)′ and I(3)′ of register 13. The remaining inputs of reset AND gate 27 (B′) are connected to I(2)′ and I(4)′ of register 13.

The trigger gate group 16 comprises a pair of AND gates 31 and 33 having their outputs connected to OR gate 35, which has its output connected to the trigger input (T) of flip-flop 10. One input of each of AND gates 31 and 33 is respectively connected to the 1-side and the 0-side of flip-flop 11. The remaining inputs of trigger AND gate 31 (B) are connected to outputs I(1)′ and I(3) of register 13. The remaining two inputs of trigger AND gate 33 (B′) are connected to the I(2)′ and I(4) of register 13.

In accordance with the invention by means of programming an operation code or by a control console four of the outputs of the instruction register 13 may be selected to be high with the remaining four outputs selected to be low. Accordingly, one or two of the AND gates of the logic network 12 is enabled with the remaining AND gates being disabled. In this manner, a desired Boolian connective or logic operation may be performed by the logic network 12 in accordance with the binary states of flip-flop 10 and 11 with the resultant being stored in accumulator 10.

The operation code for the true instruction signals I(1)–I(4) is illustrated in FIG. 3 and it will be understood that the complementary instruction signals I(1)′–I(4) are the complement of each corresponding true instruction signal. For differing operation codes, as illustrated in FIG. 3, there are provided a total of sixteen possible logical operations, the algebraic functions of which are listed. These sixteen possible output responses may also be defined as switching functions and are described in detail in the above-cited Handbook at page 17–03 et seq.

In order to understand the operation of logic network 12, several of the specific logical operations will be described in detail. For the example of an AND function, the true binary operation code is 1000. Accordingly, all of the AND gates of logic network 12 are disabled except for AND gate 27 which is enabled. As previously described, gate 27 is connected to the 0-side output of flip-flop 11, thus, if both flip-flops 10 and 11 are in a 1-state, the 0-side of flip-flop 11 is down and gate 27 is disabled so that flip-flop 10 is maintained in its 1-state which is correct. On the other hand, if A—1 and B—0, then the high output of flip-flop 11 is applied to enable complementary AND gate 27 to produce a 1-state signal at the time of the clock thereby to reset flip-flop 10 in its 0-state.

Thus, a resultant 0-state is stored in flip-flop 10 which is correct for A—1 and B—0. On the other hand, if A—0 and B—1, gate 27 is disabled and flip-flop 10 remains in its 0-state, which is correct. For the remaining condition in A—0 and B—0, then gate 27 produces a high output at the time of the clock pulse, which is effective to reset the already reset flip-flop 10 which remains in its 0-state, which is correct.

Another AND switching function that may be observed is A′B having the binary operation code 0010. Accordingly, reset AND gate 27 and trigger AND gate 31 are enabled. It will be understood that gate 27 is connected to the 0-side of flip-flop 11 while gate 31 is connected to the 1-side of flip-flop 11. Thus, if A—1 and B—1 then a high input is applied to enable gate 31 while a low input is applied to disable gate 27. Thus, gate 31 produces a high output which is applied by way of OR gate 35 to trigger flip-flop 10 from its 1-state to its 0-state. The resultant 0-state of flip-flop 10 is correct for the logic function A′B with A—1 and B—1. Similarly, if A—1 and B—0, then a high input is applied to gate 27, thereby to reset flip-flop 10 to produce a correct resultant state of that flip-flop. On the other hand, if A—0 and B—1, then a high input is again applied to AND gate 31 thereby to trigger flip-flop 10 from its 0-state to its 1-state which is the correct result for the initial inputs. For the remaining condition A—0 and B—0, a high input is applied to gate 27 thereby to reset the already reset flip-flop 10 which is correct.

In similar manner, for the logic operation AB′ a binary operation code 0100 is produced which is effective to enable AND gate 26 while disabling all the remaining AND gates. Gate 26 is connected to the 1-side output of flip-flop 11 and with the operands in the states A—1 and B—1, a high output is produced by gate 26 at the time of the falling edge of the clock pulse which is effective to switch flip-flop 10 to its 0-state which is a correct result. With A—1 and B—0, a low input is applied to gate 26 and flip-flop 10 remains in its 1-state which is correct. With A—0 and B—1 a high input is applied to AND gate 26 and the already reset flip-flop 10 is reset which is the correct result. With A—0 and B—0 no change is produced which is correct.

The NOR function may be expressed as A′ B′ and has an operation code 0001. Accordingly, reset gate 26 as well as trigger gate 33 are enabled. Thus, with A—1 and B—1, a high input is applied to gate 26 thereby to produce a signal at the time of the falling edge of the clock to reset flip-flop 10 to its 0-state which is correct for the input operands. Similarly, with the condition A—1 and B—0, a high input is applied to gate 33 which is effective to trigger flip-flop 10 to its 0-state which is also correct. For the condition A—0 and B—1, a high input is applied to gate 26 which is effective to reset flip-flop 10 to its 0-state which is correct. For the only true condition, viz, A—0 and B—0, a high input is applied to gate 33 which is effective to trigger flip-flop 10 from its 0-state to its 1-state to produce a resultant in the accumulator flip-flop 10 which is correct.

The general OR expression has the operation code 1110. Thus, only AND gate 20 is enabled which is connected to the 1-side of flip-flop 11. Thus, if the operands are in the state A—1, B—1, a high input is applied to gate 20 which is effective to set flip-flop 10 which is already set in its 1-state which is correct. If A—0 and B—0 a low input is applied to gate 20 and flip-flop 10 remains in its 1-state which is correct. Similarly, if A—0 and B—1 a high input is applied to gate 20 thereby to set flip-flop 10 from its 0-state to its 1-state which is correct. However, if A—0 and B—0, then flip-flop 10 remains in its 0-state which is correct..

A similar switching instruction of $A'+B'$ is commonly called a NAND function which has a binary operation code of 0111. Thus, set gate 21 as well as trigger gate 31 are enabled with gate 21 being connected to the 0-side and gate 31 connected to the 1-side of flip-flop 11. Accordingly, if A—1 and B—1, then gate 31 has a high input applied thereto which is effective to trigger gate 10 from its 1-state to its 0-state which is correct for the NAND function. On the other hand, if A—1 and B—0, then a high input is applied only to gate 21 thereby to set flip-flop 10 which is already set which is correct. If A—0 and B—1, then a high input is applied to trigger gate 31, thereby to apply a triggering pulse to flip-flop 10 to switch that flip-flop from its 0-state to its 1-state which is a correct condition for the input operands. With A—0 and B—0, a high input is applied to gate 21 which is effective to set flip-flop 10 to its 1-state which is correct.

The EXCLUSIVE-OR switching function is produced by the operation code 0110 which is effective to enable gate 31. If A—1 and B—1, a high input is applied to gate 31 to switch flip-flop 10 from its 1-state to its 0-state which is correct. If A—1 and B—0, flip-flop 10 remains in its 1-state which is correct. If A—0 and B—1, a high input is applied to gate 31 to switch flip-flop 10 to its 1-state which is correct. On the other hand, if A—0 and B—0, no change is produced and flip-flop 10 remains in its 0-state which is correct.

For the SET logic operation, flip-flop 10 is set to its 1-state no matter what the initial state of flip-flop 11. Accordingly, the operation code is 1111 and both set gates 20 and 21 are enabled. Thus, if flip-flop 11 is in a 0-state or a 1-state, a high input is applied to the set input of flip-flop 10 thereby to set that flip-flop. Conversely, the RESET logic operation is produced by enabling gates 26 and 27 so that no matter what the state of flip-flop 11, flip-flop 10 is reset. Similarly, the COMPLEMENT A function is produced by enabling both trigger gates 31 and 33 so that no matter what the state of flip-flop 11, flip-flop 10 is triggered. On the other hand, the function TRUE A is produced by having no change occur in flip-flop-10 whatever the state of flip-flop 11.

From the above explanation of the operation of the differing gates of logic network 12 it will be understood that the operation code is selected so that no more than two AND gates are enabled at any one time, to obtain the correct results. For example, for the AND switching function, only reset gate 27 is enabled which produces a high output when B′—1. On the other hand, for the switching function A′B′(1) reset gate 26 is enabled which produces a high output when B—1 and (2) trigger gate 33 is enabled which produces a high output when B′—1. On the other hand, for the COMPLEMENT function, A′ both trigger gates 31 and 33 are enabled so that an output is produced from OR gate 36 when B—1 and B′—1. The foregoing are shown in the table of FIG. 4 as well as all of the remaining switching functions of the present invention.

It will now be understood that in accordance with the invention, all of the logical operations also referred to herein as switching functions and Boolian Connectives, that are produced are a function of the operands A and B. Operand A is treated as a means to obtain the correct result. Thus, without knowing the state of operand A flip-flop 10 and merely by knowing the state of operand B flip-flop 11 a correct result may be switched into the A flip-flop in accordance with the invention.

In order to better understand the invention, the true and the complementary "anding" of the four possible combinations of the A and B literals may be expressed:

FUNCTION

| | OR | AND | SET | RESET | TRIGGER |
|---|---|---|---|---|---|
| "True" | $\overline{A'+B'}$ | AB | | B′ | |
| | $\overline{A+B'}$ | A′B | | B′ | B |
| | $\overline{A'+B}$ | AB′ | | B | |
| "Anding" | $\overline{A+B}$ | A′B′ | | B | B′ |
| "Complementary" | A+B | $\overline{A'B'}$ | B | | |
| | A+B′ | $\overline{A'B}$ | B′ | | |
| | A′+B | $\overline{AB'}$ | B | | B′ |
| "Anding" | A′+B′ | $\overline{AB}$ | B′ | | B |

It will be seen from Table 1 that for the first four true AND functions (1) when the B term is true an enabling instruction signal is applied to B′ reset gate 27, (2) when the B term is complementary an enabling instruction signal is applied to the B reset gate 26, and (3) when the A term is complementary an enabling signal is applied to (i) the B trigger gate 31 when the B term is true and (ii) the B′ trigger gate 33 when the B term is complementary.

With regard to the remaining four functions they are commonly written as OR functions but can also be written as complementary AND functions. It will be seen from these functions that: (1) when the B term of the function is true, an enabling signal is applied to the B′ set gate 21 (2) when the B term is complementary an enabling instruction signal is applied to the B set gate 20, and (3) when the A term of the function is true, an enabling instruction signal is applied to (i) the B trigger gate 31 when the B term is true and (ii) the B′ trigger gate 33 when the B term is complementary.

With the above understanding of the invention, it is believed it will be readily apparent how each one of the logic networks 12 are utilized with each of the bits of the accumulator and operand register of FIG. 1. The invention is not limited to the sixteen bits of FIG. 1, but is readily applicable to words of any number of bits. Accordingly, many modifications may be made all within the scope of the appended claims.

What is claimed is:

1. A logic network for providing logical operations between a binary cell representative of an operand A and a binary cell representative of an operand B and for storing the result back in the cell A comprising said cell A having a reset, a set and a trigger input, said cell B having a 1-side and a 0-side output, set gate means having an output connected to said set input and including a first and a second set gate, reset gate means having an output connected to said reset input and including a first and a second reset gate, trigger gate means having an output connected to said trigger input and including a first and a second trigger gate, means connecting said 1-side output of cell B to an input of each of said first gates, means connecting said 0-side of cell B to an input of each of said second gates, and instruction means connected to each of said first and second gates for providing instruction enabling signals to select a logical operation to be performed by said logic network which is a true "anding" of the four possible combinations of the A and B literals without using A physically to apply:

(1) an enabling signal to said second reset gate when the B term of the function is true, (2) an enabling signal to said first reset gate when the B term is complementary, and (3) when the A term is complementary on enabling signal to (a) said first trigger gate when the B term is true and (b) said second trigger gate when the B term is complementary.

2. The logic network of claim 1 in which each of said first and said second gates is an AND gate.

3. The logic network of claim 2 in which there is provided a respective OR gate for said set gate means, said reset gate means and said trigger gate means and each of said OR gates having its inputs connected to the outputs of the first and second AND gates of the corresponding gate means.

4. The logic network of claim 3 in which there is provided a source of clock pulses connected to each of said first and second AND gates and in which each of said OR gates is connected to a corresponding input of said cell A.

5. A logic network operable for producing a desired one of a plurality of logical functions for operands A and B in a first and second binary register circuit and for storing the result in said first register circuit comprising said first register circuit having a reset, a set and a trigger input, said second register circuit having a 1-side and a 0-side output, set gate means having an output connected to said set input and including a first and a second set AND gate, reset gate means having an output connected to said reset input and including a first and a second reset AND gate, trigger gate means having an output connected to said trigger input and including a first and a second trigger AND gate, means connecting said 1-side output of said second register circuit to an input of each of said first AND gates, means connecting said 0-side output of said second register circuit to an input of each of said second AND gates, and an instruction register connected to each of said first and second AND gates for selecting a desired logical function to be performed by said logic network to provide (1) a true "anding" of the four possible combinations of the A and B literals in which:

(a) when the B term of the function is true, an enabling signal is applied to said second reset AND gate, (b) when the B term of the function is complementary an enabling signal is applied to said first reset AND gate, and (c) when the A term of the function is complementary an enabling signal is applied to (i) said first trigger AND gate when the B term is true and (ii) said second trigger AND gate when the B term is complementary, (2) A complementary "anding" of the four possible combinations of the A and B literals in which (a) when the B term of the function is true an enabling signal is applied to said second set AND gate, (b) when the B term of the function is complementary an enabling signal is applied to said first set AND gate, and (c) when the A term of the function is true, an enabling signal is applied to (i) said first trigger AND gate when the B term is true and (ii) said second trigger AND gate when the B term is complementary.

6. The logic network of claim 5 in which there is provided a respective OR gate for said set gate means, said reset gate means and said trigger gate means and each of said OR gates having its inputs connected to the outputs of the first and second AND gates of the corresponding gate means.

7. The logic network of claim 6 in which there is provided a source of clock pulses connected to each of said first and second AND gates and in which each of said OR gates is connected to a corresponding input of said first register circuit.

8. A system for providing Boolian connectives in parallel between a first register having a plurality of first binary cells representative of a binary word of operands A and a second register having a plurality of second binary cells representative of a binary word of operands B comprising, a plurality of logic networks each switchable to provide a selected one of a plurality of logical functions, said plurality of logic networks corresponding in number with the number of bits in a word and respectively associated with said bits, means connecting each logic network between a corresponding first cell and a corresponding second cell, each of said first cells having a reset, a set and a trigger input, each of said second cells having a 1-side and a 0-side output, and each of said logic networks having:

(1) set gate means having an output connected to a corresponding set input and including a first and a second set gate, (2) reset gate means having an output connected to a corresponding reset input and including a first and a second reset gate, (3) trigger gate means having an output connected to a corresponding trigger input and including a first and a second trigger gate, (4) means connecting said 1-side output of each said second cells to an input of each of said corresponding gates, (5) means connecting said 0-side output of each said second cells to an input, of each of said corresponding second gates.

9. The system of claim 8 in which there is provided an instruction register connected to each of said first and second gates of each logic network for applying instruction enabling signals to select a desired logical function to be performed simultaneously by said logic networks to provide (1) a true "anding" of the four possible combinations of the A and B literals in which:

(a) when the B term of the function is true an enabling signal is applied to each second reset gate, (b) when the B term of the function is complementary an enabling signal is applied to each first reset gate, and (c) when the A term of the function is complementary an enabling signal is applied to (i) each first trigger gate when the B term is true and (ii) each second trigger gate when the B term is complementary, (2) a complementary "anding" of the four possible combinations of the A and B literals in which:

(a) when the B term of the function is true an enabling signal is applied to each second set gate, (b) when the B term of the function is complementary, an enabling signal is applied to each first set gate, and (c) when the A term of the function is true, an enabling signal is applied to (i) each first trigger gate when the B term is true and (ii) each second trigger gate when the B term is complementary.

10. The system of claim 9 in which each of said first and second gates of each logic network is an AND gate and in which there is provided a source of clock pulses connected to each of said first and second AND gates.

References Cited

UNITED STATES PATENTS 3,291,974 12/1966 Even ------------ 235—152 X

DONALD D. FORRER, *Primary Examiner.*

U.S. Cl. X.R.

235—152; 307—203, 207, 215, 218